United States Patent
Papenfuhs et al.

(10) Patent No.: US 7,319,118 B2
(45) Date of Patent: Jan. 15, 2008

(54) FOOD-COATING COMPOSITION, PROCESS FOR PREPARATION THEREOF AND USE

(75) Inventors: Bernd Papenfuhs, Obertshausen (DE); Holger Schimanke, Dossenheim (DE)

(73) Assignee: Celanese GmbH (DE)

( * ) Notice: Subject to any disclaimer, the term of this patent is extended or adjusted under 35 U.S.C. 154(b) by 313 days.

(21) Appl. No.: 10/824,984

(22) Filed: Apr. 14, 2004

(65) Prior Publication Data

US 2004/0229997 A1 Nov. 18, 2004

(30) Foreign Application Priority Data

Apr. 16, 2003 (DE) ............................... 103 17 489

(51) Int. Cl.
*C08F 218/04* (2006.01)
*A23C 19/16* (2006.01)
*C09D 131/02* (2006.01)

(52) U.S. Cl. ...................... 524/503; 524/524; 524/557; 524/559; 524/564; 229/87.08; 426/89; 426/125; 426/297; 426/302; 426/310

(58) Field of Classification Search ................ 524/503, 524/524, 557, 559, 564; 229/87.08; 426/89, 426/125, 297, 302, 310
See application file for complete search history.

(56) References Cited

U.S. PATENT DOCUMENTS

| | | | | |
|---|---|---|---|---|
| 6,558,719 B1 * | 5/2003 | Blumenberg et al. | ....... | 426/105 |
| 2005/0107515 A1 * | 5/2005 | Jakob et al. | ................ | 524/503 |

FOREIGN PATENT DOCUMENTS

| | | |
|---|---|---|
| DE | 10163586 | 7/2003 |
| PL | 172130 | 12/1994 |
| SU | 507299 | 3/1976 |
| WO | WO 03/054041 | 7/2003 |

* cited by examiner

*Primary Examiner*—Kelechi C. Egwim
(74) *Attorney, Agent, or Firm*—Connolly Bove Lodge & Hutz LLP

(57) ABSTRACT

The present invention relates to the use of aqueous copolymer poly(vinyl ester) dispersions which comprise cellulose ethers in an amount up to a maximum of 0.45% by weight in food-coating compositions, and also food-coating compositions which comprise these aqueous copolymer poly (vinyl ester) dispersions, and their use in the coating of food, especially in the production of hard cheese.

26 Claims, No Drawings

FOOD-COATING COMPOSITION, PROCESS FOR PREPARATION THEREOF AND USE

The present invention relates to a food-coating composition, to an improved process for preparing, by emulsion polymerization, plastic dispersions which are preferably used for coating cheese, and to the use of said plastic dispersions for food-coating.

Polymer dispersions have been used for many years in many countries for coating hard cheese. This surface treatment prevents not only mold formation on the cheese, but also excessively rapid drying out of the cheese loaf during the ripening process. Hard cheeses require a ripening time lasting several months, during which time they are stored in rooms having relatively high atmospheric humidity. During this time, to avoid the formation of mold on the surface of the cheese loaf, the cheese, previously, has been washed manually again and again with aqueous acetic acid, which, however, is a considerable labor expenditure. As soon as it was possible, therefore, a transition was made to apply a protective plastic coating to the cheese to prevent the troublesome mold infection. The latices used for the protective coating, which have in general been prepared by emulsion polymerization, must themselves, however, be as germ-free as possible and have a high resistance toward microbiological infestation.

The plastic dispersions used in the prior art for cheese coating are preferably aqueous dispersions based on vinyl acetate—dibutyl maleate copolymers, as are described, for example, in SU inventor's certificate No. 507299 or have been brought onto the market by Hoechst AG under the name ®Mowilith DM 2 KL. According to the technical leaflet "Mowilith DM 2 KL ca. 45%", published by Hoechst AG in April 1987, the product is a plasticizer-free aqueous dispersion of a vinyl acetate—di-n-butyl maleate copolymer containing polyvinyl alcohol as emulsifier and stabilizer (protective colloid). Corresponding secondary products have been prepared and distributed by Clariant and are now prepared and distributed by Celanese Emulsions GmbH.

The preparation of dispersions of very similar chemical composition which have coat-forming properties, the coating of cheese not being mentioned, however, is described in PL-B-172 130. The dispersions based on copolymers of vinyl acetate, maleic esters (preferably dibutyl maleate) and if appropriate other comonomers further comprise an ethoxylated fatty alcohol as emulsifier and also a mixture of hydroxyethyl cellulose and polyvinyl alcohol as protective colloid, preference as polyvinyl alcohol being given to one having a viscosity of the 4% strength aqueous solution of approximately 18 mPa·s and a degree of saponification of approximately 88% (PA 18-88).

Matching the plastic dispersions to the requirements of the consumers is frequently very difficult, because their factories are subject to very strict legal provisions and permanent controls relating to chemical substances which come into direct contact with foods. These provisions usually comprise positive lists of chemical compounds in which the permitted chemicals are exhaustively listed.

A pronounced tendency of the plastic dispersions toward formation of aggregates of polymer particles virtually regularly leads to problems at the consumers, because this leads to deficient shear stability. The majority of difficulties in cheese coating result from this. The formation of large aggregates of polymer particles, however, can also lead, during the preparation of the plastic dispersions, to inhomogeneities in the reaction mixture, to deficient heat removal and, in the final result, to fluctuating product viscosities and thus fluctuations in quality which are in an intolerable range.

The object therefore underlying the invention was to provide a dispersion as a basis for antimicrobially finished aids for food-coating, preferably for cheese ripening based on a copolymer of vinyl esters and dialkyl esters of maleic or fumaric acid, which dispersion is improved to the extent that, compared with conventional products, it has a consistently high viscosity and it is distinguished by a markedly improved film glossiness and thus an improved visual appearance of the coated food, preferably of the coated cheese loaf and simultaneously an improved shear stability and thus a reduced tendency to aggregation of the polymer particles.

A solution of this object has already been proposed in the German patent application No. 101 63 586.9 which was unpublished at the priority of the present application. However, therein, the protective colloid specified is a mix of polyvinyl alcohols having different degrees of saponification (=degree of hydrolysis).

Surprisingly, it has now been found that this object is achieved by a copolymer poly(vinyl ester) dispersion which comprises cellulose ethers in relatively low amounts, this being in an amount of from 0 to 0.45% by weight, based on the mass of the total monomers, and if appropriate further stabilizers.

The present invention thus relates to a cellulose ether-free or low amount of cellulose ether containing food-coating composition comprising an aqueous copolymer poly(vinyl ester) dispersion which comprises A) 100 parts by weight of a copolymer of from 40 to 95% by weight of vinyl esters of aliphatic saturated carboxylic acids, preferably fatty acids having a chain length of $C_2$-$C_{18}$, from 5 to 60% by weight of maleic esters and/or fumaric esters of monohydric aliphatic alcohols having a chain length of $C_1$-$C_{18}$ and if appropriate other comonomers, B) from 0.1 to 1.0 parts by weight of an emulsifier, preferably a nonionic emulsifier, C) from 0 to 0.45, preferably from 0 to 0.4, particularly preferably from 0 to 0.3, very particularly preferably from 0 to 0.15 parts by weight of a cellulose ether or especially preferred no cellulose ether and D) optionally other stabilizers.

The present invention further relates to the use of an aqueous copolymer poly(vinyl ester) dispersion of the abovedescribed makeup in food-coating compositions.

The vinyl esters of aliphatic saturated carboxylic acids in the copolymer are typically vinyl esters of aliphatic saturated carboxylic acids of chain length $C_1$-$C_{18}$, for example, vinyl formate, vinyl acetate, vinyl propionate, vinyl butyrate, vinyl isobutyrate, vinyl pivalate, vinyl 2-ethylhexanoate, vinyl esters of α-branched carboxylic acids having 9 to 11 carbon atoms in the acid group (®Versatic acids), the vinyl esters of lauric, palmitic, myristic and stearic acid. Preferred are vinyl esters of aliphatic saturated carboxylic acids of chain length $C_2$-$C_{18}$. The content of these vinyl esters in the polymer is at least 40% by weight, preferably at least 50% by weight.

The use of vinyl esters of aliphatic fatty acids is preferred, among them in particular vinyl acetate. Said vinyl esters can also be present next to one another in the polyvinyl ester.

The maleic and fumaric esters of monohydric aliphatic alcohols of chain length $C_1$-$C_{18}$ in the copolymer are those of saturated alcohols of chain length $C_1$-$C_{18}$ or those with monohydric aliphatic unsaturated alcohols of chain length $C_3$-$C_{18}$, but preferably those with saturated alcohols of chain length $C_4$-$C_8$, in particular dibutyl maleate, or bis(2-ethylhexyl) maleate and/or fumarate. The content of this monomer group, optionally in combination with other comonomers, is from 5 to 60% by weight, preferably from 20 to 50% by weight.

Particular preference is given to the use of dibutyl maleate and/or fumarate.

Other comonomers which can be used in the copolymer include the acrylic and methacrylic esters of monohydric aliphatic saturated alcohols and ether alcohols of chain length $C_1$-$C_{18}$, vinyl chloride, vinylidene chloride, acrylonitrile and methacrylonitrile, ethylene, butadiene, isoprene, isobutylene, propylene, $C_{14}$-$C_{16}$ alpha-olefins, 2-chlorobutadiene, 2,3-dichlorobutadiene, tetrafluoroethylene, styrene, vinyl ethers of monohydric aliphatic saturated alcohols of chain length $C_1$-$C_{18}$, acrylic acid, methacrylic acid, crotonic acid, maleic acid, fumaric acid, itaconic acid, vinylsulfonic acid, styrenesulfonic acid, half esters of maleic or fumaric acid and of itaconic acid with monohydric aliphatic saturated alcohols of chain length $C_1$-$C_{18}$ and also their alkali metal salts and ammonium salts, vinylpyrrolidone, amides of acrylic and methacrylic acid and N-methylolamides of acrylic and methacrylic acid and also their ethers, N-vinyl-N-methylacetamide, acrylic esters of diethylaminoethanol and/or methacrylic esters of dimethylaminoethanol, acrylic and methacrylic esters of dihydric aliphatic alcohols of chain length $C_2$-$C_{18}$, divinyl and diallyl esters of saturated and unsaturated aliphatic dicarboxylic acids of chain length $C_3$-$C_{18}$, vinyl and allyl esters of acrylic acid and crotonic acid, triallyl cyanurate, sodium 2-sulfoethylmethacrylate, the esters of aliphatic carboxylic acids of chain length $C_3$-$C_{12}$ with unsaturated alcohols of chain length $C_3$-$C_{18}$, or esters of unsaturated aliphatic dicarboxylic acids with polyethylene glycols and/or polypropylene glycols. Preference is given as further comonomers to ethylene, the acrylic esters of monohydric aliphatic saturated alcohols of chain length $C_4$-$C_8$, or $C_{14}$-$C_{16}$ alpha-olefins.

Preferably, however, in addition to the two abovementioned groups of vinyl esters and maleates, no other comonomers are used.

Suitable emulsifiers are sodium salts, potassium salts and ammonium salts of unbranched aliphatic carboxylic acids of chain length $C_{12}$-$C_{20}$, sodium hydroxyoctadecanesulfonate, sodium salts, potassium salts and ammonium salts of hydroxyl fatty acids of chain length $C_{12}$-$C_{20}$ and their sulfonation or acetylation products, alkyl sulfates, triethanolamine salts, alkyl($C_{10}$-$C_{20}$)sulfonates, alkyl($C_{10}$-$C_{20}$)arylsulfonates, dimethyldialkyl-($C_8$-$C_{18}$)ammonium chloride, acyl-, alky-, oleyl- and alkylarylethoxylates and their sulfonation products, alkali metal salts of sulfosuccinic esters with aliphatic saturated monohydric alcohols of chain length $C_4$-$C_{16}$, sulfosuccinic 4-esters with polyethylene glycol ethers of monohydric aliphatic alcohols of chain length $C_{10}$-$C_{12}$(disodium salt), sulfosuccinic 4-esters with polyethylene glycol nonylphenyl ethers (disodium salt), sulfosuccinic biscyclohexyl esters (sodium salt), lignosulfonic acid and also its calcium, magnesium, sodium and ammonium salts, polyoxyethylene sorbitan monooleate containing 20 ethylene oxide groups, resin acids, hydrogenated and dehydrogenated resin acids and their alkali metal salts, dodecylated diphenyl ether disulfonic acid sodium and also copolymers of ethylene oxide and propylene oxide having a minimum content of 10% by weight of ethylene oxide.

Preferred emulsifiers are: sodium lauryl sulfate; sodium lauryl ether sulfate, ethoxylated (3 ethylene oxide groups); the polyethylene glycol (4-20) ethers of oleyl alcohol and also the polyethene oxide (4-14) ethers of nonylphenol.

In particular, suitable emulsifiers are nonionic emulsifiers, more specifically the polyethyene oxide (4-20) ethers of oleyl alcohol. These compounds are used at from 0.1 to 1.0% by weight, based on the amount of the total monomers, preferably from 0.2 to 0.85% by weight, and particularly preferably from 0.25 to 0.5% by weight.

Suitable cellulose ethers according to the invention are methyl celluloses, hydroxyethyl and propyl celluloses and also sodium carboxymethyl cellulose. These can be used according to the invention for stability improvement. The cellulose ethers can also be used as thickeners and, optionally, are not added until after termination of the polymerization to establish a suitable application viscosity.

Further stabilizers which can be used are polyvinyl alcohols.

According to the invention any polyvinyl alcohol can be used, mixtures of polyvinyl alcohols with the same degree of hydrolysis being preferred. Especially preferred polyvinyl alcohols have a high degree of hydrolysis in the range from 85 to 90 mol % and viscosities of the 4% by weight aqueous solutions at 20° C. of from 2 to 70 mPa·s. The polyvinyl alcohol acts as protective colloid. Its total amount is from 1 to 10% by weight, based on the mass of the total monomers. Preferably, the amount used is from 2 to 9% by weight, and particularly preferably from 3 to 8% by weight.

Polyvinyl alcohols used according to the invention preferably possess an uniform degree of hydrolysis, this means they are not mixtures of polyvinyl alcohols with different degrees of hydrolysis.

Preferably used are polyvinyl alcohols with uniform degree of hydrolysis and different molecular weights.

The viscosities of polyvinyl alcohols used according to the invention are typically within the range of from 2 to 70 mPa·s (determined in a 4% by weight aqueous solution at 20° C.).

A preferred embodiment of the invention is represented by an aqueous copolymer poly(vinyl ester) dispersion as constituent of a food-coating composition which comprises A) 100 parts by weight of a copolymer of from 40 to 95% by weight of vinyl acetate and from 5 to 60% by weight of dibutyl maleate and/or fumarate, and optionally other comonomers, B) from 0.25 to 0.7 parts by weight, preferably from 0.25 to 0.5 parts by weight of an ethoxylated oleyl alcohol, C) from 0 to 0.3 parts by weight of a hydroxyethyl cellulose and also D) from 3 to 8 parts by weight of polyvinyl alcohol.

The solids content of the dispersion is from 20 to 65% by weight, preferably from 30 to 60% by weight, and particularly preferably from 40 to 55% by weight.

Simply omitting the cellulose ethers or reducing their amount in the dispersion which is not otherwise modified usually leads to deficient stability and thus to unusable products.

This is demonstrated, for example, in markedly increased screen oversize values, compared with the standard, which have, as consequence, an uneconomic shortening of the time period between filter changes, including even in coagulation of the dispersions.

The colloidal stabilization of the dispersion which is taken away together with the cellulose ether must be supplied back to the system in another manner, which is effected according to the invention by targeted matching of the formulae to the dispersions obtainable by the metered-addition process, namely by using appropriate amounts of stabilizer and/or emulsifier, preferably 0.25 to 0.5% by weight of emulsifier and/or 3 to 8% by weight of polyvinyl alcohol or a mixture thereof with uniform degree of hydrolysis.

The inventive dispersions are prepared according to the invention by free-radical emulsion polymerization. The polymerization is preferably carried out in the metered-addition process, in which, according to the invention, a relatively large amount of the monomers, preferably from 10 to 15% by weight, based on the mass of the total monomers, is charged to start the polymerization. With, at the same time, only slightly increased amounts of emulsifier and polyvinyl alcohol, dispersions may be prepared having only a low content of cellulose ether, their improved performance properties are completely retained, and which, nevertheless, have stability comparable with known dispersions.

Initiators used for the emulsion polymerization are, for example: hydrogen peroxide, benzoyl peroxide, cyclohexanone peroxide, isopropylcumyl hydroperoxide, persulfates of potassium, sodium and ammonium, peroxides of even-numbered saturated monobasic aliphatic carboxylic acids of chain length $C_8$-$C_{12}$, tertiary butyl hydroperoxide, ditertiary butyl peroxide, diisopropyl percarbonate, azoisobutyrodinitrile, acetyl-cyclohexanesulfonyl peroxide, tertiary butyl perbenzoate, tertiary butyl peroctoate, bis(3,5,5-trimethyl) hexanoyl peroxide, tertiary butyl perpivalate, hydroperoxypinane, p-methane hydroperoxide. The above-mentioned compounds can also be used within a redox system, in which case transition metal salts such as iron(II) sulfate or other reducing agents being co-used. Reducing agents or regulators which a re co-used can be alkali metal salts of hydroxymethanesulfinic acid, mercaptans of chain length $C_{10}$-$C_{14}$, 1-buten-3-ol, hydroxylamine salts, sodium dialkyldithiocarbamate, sodium bisulfite, ammonium bisulfite, sodium dithionite, diisopropyl-xanthogen disulfide, ascorbic acid, tartaric acid, isoascorbic acid, boric acid, urea and formic acid.

Preference, however, is given to water-soluble persulfates, in particular ammonium persulfate or sodium persulfate for starting the polymerization.

After completion of the polymerization, to remove monomers, a further after-treatment can follow, preferably with redox catalysts, for example combinations of oxidizing agents with reducing agents such as ascorbic acid.

Further aids can be added to the dispersion at the end. This group of aids includes, for example, the already mentioned stabilizers. Suitable additives are stabilizers such as neutralizing agents and complexing agents. Those which may be mentioned by way of example are hydroxides, carbonates and phosphates of alkali metals, ammonium and of calcium, alkali metal salts of ethylenediaminetetraacetic acid and N-hydroxyethylethylene-diaminetriacetic acid, citric acid, and also sodium acetate and phosphoric acid, ammonium chloride, sodium sulfate, a homopolymer of 2-acrylamido-2-methylpropanesulfonic acid and its sodium, potassium and ammonium salts, and also substances for protecting the dispersion from microbial infestation. Preferably, preservatives are used which are permitted in the relevant regulations on provisions under food law on additives for cheese.

To adjust the dispersion to give the finished cheese-coating composition, use can be made of the colors which are permitted in the relative positive lists such as carotene (E 160a), annatto (E 160b), Carbo medicinalis vegetabilis (E 153), titanium dioxide (E 171), tartrazine (E 102), quinoline yellow (E 104), sunset yellow FCF (E 110), cochenille red A (E 124), indigotine (E 132), brilliant black BN (E 151) or lithol rubine BK (E 180).

A particularly preferred selection of the raw materials used for preparing and finishing the dispersion corresponds to the guidelines of The Netherlands Warenvet B.1.4 and/or to "XIV. Empfehlung, Teil B der BGW" [XIVth recommendation, part B of the BGW (German Federal Institute for Protection of Consumer Health and Veterinary Medicine)].

The inventive dispersions containing less or no cellulose ether are distinguished from conventional products by a higher microbiological stability. This is because cellulose ethers, as modified natural substances, are very readily biodegradable, and their presence therefore increases the tendency of the product toward spoilage.

A considerable advantage of the invention from the production aspect is the significantly narrower bandwidth of the viscosity with which the dispersions are produced by the emulsion polymerization, because maintaining the product specification which is assured to clients when large amounts are delivered is considerably simplified.

The dispersions prepared according to the invention are further distinguished, at constantly high viscosity, by a markedly improved film glossiness and at the same time improved shear stability, because the degree of aggregation of their polymer particles is greatly reduced. They are especially suitable as a constituent for preparing food-coating compositions, in particular as an aid for ripening of hard cheese.

The examples hereinafter serve to illustrate the invention. Figures on parts and percentages are based on the weight, unless noted otherwise.

General Description of Polymerization by the Metered-Addition Process:

On the day before the emulsion polymerization, the bath is prepared in a 10 l capacity cylindrical glass reactor equipped with two dropping funnels, internal thermometer, reflux condenser, anchor agitator and a heating apparatus (water bath).

For this, the entire amount of water is charged and, with agitation at room temperature, the protective colloid (®Tylose and/or ®Mowiols), the emulsifier (®Genapol O-100) and sodium acetate are slowly added in succession. After a dissolution process for 3 hours at an internal temperature of approximately 90° C., the reactor was allowed to cool and stand overnight.

Acetic acid was then added to the batch, with stirring, and 150 or 300 g of the monomer mixture (monomer charge) was emulsified with the mixture. The reactor was then heated and the polymerization was initiated at a temperature of 65° C. by adding the first subquantity of ammonium persulfate (APS I).

After 15 minutes, the uniform concurrent metered-addition of the residual monomer mixture and the APS II in the course of a period of 4 hours was started; the reaction temperature was kept constant during this time in a range from 68 to 70° C. (bath temperature approximately 66° C.).

When the metered-addition phase was complete, APS III was added and the internal temperature was allowed to rise by stepwise harmonization to the external temperature (up to 90° C.) and to a maximum of approximately 92° C. Thereafter polymerization was continued for a further hour at a bath temperature of 90° C. and thereafter the system was cooled.

To reduce the residual monomer content, as redox system at a temperature of 70° C., tert-butyl hydroperoxide (®Trigonox AW 70) and, at 65° C., ascorbic acid, were added. The mixture was adjusted to pH 5 below 40° C. using 10% strength sodium hydroxide solution.

Formulas of the Examples and of the Comparative Example

The comparative example corresponds to a standard formula comprising 0.5% cellulose ether (always based on the mass of total monomer), whereas examples 1 and 2 have no cellulose ether or a reduced content (0.25%). The dispersions, furthermore, have been optimized with respect to their stability by higher initial charge of monomer and increased concentrations of polyvinyl alcohol (®Mowiol 40-88) and emulsifier (®Genapol O-100).

All tabulated data are amounts in grams; the values given in brackets are based on distilled water used as solvent.

|  | Example 1 | Example 2 | Comparative example |
|---|---|---|---|
| Bath: |  |  |  |
| Distilled water | 3018 | 3009 | 3000 |
| Mowiol 40-88 | 120 | 105 | 90 |
| Mowiol 8-88 | 60 | 60 | 60 |
| Tylose H 4000 | 0 | 7.5 | 15 |
| Genapol O-100 | 9 (=0.3%) | 7.5 (=0.25%) | 6 (=0.2%) |
| Sodium acetate · 3H$_2$O | 4.9 | 4.9 | 4.9 |
| Glacial acetic acid | 3 | 3 | 3 |
| Monomers: |  |  |  |
| Vinyl acetate | 1725 | 1725 | 1725 |
| Dibutyl maleate | 1225 | 1225 | 1225 |
| Initial monomer charge | 300 | 300 | 150 |
| Initiator: |  |  |  |
| APS I | 5.4 (54) | 5.4 (54) | 5.4 (54) |
| APS II | 1.5 (150) | 1.5 (150) | 1.5 (150) |
| APS III | 1.5 (30) | 1.5 (300) | 1.5 (30) |
| Post-additions: |  |  |  |
| ® Trigonox AW 70 | 2.4 (50) | 2.4 (50) | 2.4 (50) |
| Ascorbic acid | 2 (50) | 2 (50) | 2 (50) |
| Sodium hydroxide solution (10% strength) | 70 | 70 | 70 |

The substances specified under the trade names ®Mowiol, ®Tylose and ®Genapol are commercial products from Clariant AG/CH, Trigonox is a registered trademark of Akzo Nobel B. V./NL.

As an index of the stability of the dispersions, directly after the pH adjustment, the screen oversize was determined.

The screen oversize corresponds to the proportion of coarse specs and coagulum in polymer dispersions and is measured as follows:

100.0 g of the homogenized dispersion sample under test are carefully diluted with 500.0 g of distilled water, without any foam forming. The mixture is then poured through a previously tared screen consisting of a suitably tensioned piece of degreased steel wire cloth (stainless steel fine wire cloth No. 375VA140K, "Multi" type, article No. 00100540-15, manufacturer: Haver & Boecker, 47400, Oelde/Wesffalia) of a mesh width of 0.04 mm and the oversize is rinsed carefully up to freedom from foam using the distilled water used for rinsing out the sample vessel (quantitative transfer). The wet screen is then placed on a clean Petri dish and dried for at least one hour at temperatures of from 105° C. to 135° C. Finally, the cold screen is reweighed and the oversize is calculated in percent by weight using the initial weight. The values given in the table correspond to the mean of a duplicate determination carried out in such a manner.

Brookfield Viscosity

Apparatus:

Brookfield RVT-DVII with spindles Nos. 1-7

Vessel (diameter 90-92 mm, height 150-160 mm)

The sample under test is stirred thoroughly by hand using a glass rod in the measurement vessel. Care must be taken to ensure that no air bubbles are present in the sample. Then, a suitable spindle, test several if appropriate, is then attached to the apparatus and immersed in the dispersion to the upper mark. If not provided otherwise, a rotational speed of 20 rpm is set on the apparatus. After the viscometer is switched on, it is allowed to rotate up to constancy of the measurement (usually reached after approximately 10 s) and the measurement is then noted. If constancy is not reached, a different spindle must be used.

Solids Content

Sample preparation:

Homogenization by agitation with glass rod

Procedure:

Very rapidly spread uniformly approximately 1 to 2 g of the sample in a previously weighed aluminum dish (G 1) and immediately thereafter reweigh it (G 2). Then place the dish thus filled into a drying cabinet (without forced ventilation) and dry it for at least a period of 12 h (overnight), but no longer than 72 h, at temperatures in the range from 105 to 130° C. Cool the dish and then reweigh it (G 3). Carry out duplicate determination and report the mean. If the individual results differ by more than 0.3%, repeat the measurement.

$$\text{Solids content} = \frac{(G3 - G1) \times 100}{G2 - G1} \ (\%)$$

pH

Single-probe glass electrode pH meter according to DIN 19 261, for example CG 817 T pH meter (Schoft-Gerate, D-6238 Hofheim)

Measure the sample after temperature compensation by immersion of the glass electrode (which is kept constantly immersed in a 3.5 molar potassium chloride solution). Immediately after measurement, rinse the glass electrode with deionized water.

Film Gloss

Film gloss was measured with a Dr. Lange Labor Reflektometer RL 3 of Dr. Bruno Lange GmbH. The samples to be investigated were applied by means of a doctor blade supplied by Erichsen in a wet layer thickness of 300 μm and thereafter dried for 24 hours at room temperature. The laboratory reflectometer was calibrated by means of calibration standard A (polished, highly glossy black glass plate). The measuring head of the reflectometer is placed on the surface of the test sample and the measument is initiated. The reflectometer measures successively at different angles of incidence. A measurement is carried out at three different locations of the surface and the arithmetic mean is calculated. The results of the 20° angle of incidence measurements are evaluated and the averaged scale division is indicated.

The results determined for the examples and for the comparative example are listed in the following table.

| | Example 1 | Example 2 | Comparative Example |
|---|---|---|---|
| Screen Oversize (%) | 0.021 | 0.026 | 0.088 |
| Brookfield Viscosity (mPa · s) | 20100 | 17200 | 29200 |
| Solids Content (%) | 47.9 | 48.1 | 48.1 |
| pH-Value | 5 | 5 | 4.8 |
| Film Gloss (scale diivision) | 124 | 130 | 90 |
| Particle Aggregates[1] | 1-10 µm | 1-10 µm | 10-100 µm |

[1] determined by microscopic image analysis

The invention claimed is:

1. A food-coating composition comprising an aqueous copolymer poly(vinyl ester) dispersion consisting essentially of:
   A) 100 parts by weight of a copolymer of from 40 to 95% by weight of vinyl esters of aliphatic saturated carboxylic acids, from 5 to 60% by weight of maleic esters and/or fumaric esters of monohydric aliphatic alcohols having a chain length of $C_1$-$C_{18}$ and optionally other comonomers; and
   B) a stabilizer system consisting of:
      1) from 0.1 to 1.0 parts by weight of an emulsifier;
      2) from 0 to 0.45 parts by weight of a cellulose ether; and
      3) from 1 to 10% by weight of at least one polyvinyl alcohol having a degree of hydrolysis in the range from 85 to 90 mol % and a viscosity of from 2 to 70 mPa·s for the 4% by weight aqueous solution at 20° C.

2. The food-coating composition as claimed in claim 1, wherein the dispersion consists essentially of, as vinyl ester of aliphatic saturated carboxylic acids a vinyl ester of aliphatic saturated carboxylic acid with chain length $C_2$-$C_{18}$.

3. The food-coating composition as claimed in claim 1, wherein the dispersion consists essentially of the vinyl esters of aliphatic saturated carboxylic acids in an amount of at least 50% by weight.

4. The food-coating composition as claimed in claim 1, wherein the dispersion consists essentially of, as maleic and fumaric esters of monohydric aliphatic alcohols of chain length $C_1$-$C_{18}$, esters of saturated alcohols of chain length $C_1$-$C_{18}$, or esters of monohydric aliphatic unsaturated alcohols of chain length $C_3$-$C_{18}$.

5. The food-coating composition as claimed in claim 1, wherein the dispersion consists essentially of the monomer group of maleic and fumaric esters, optionally in combination with other comonomers, in an amount of from 20 to 50% by weight based on the weight of the copolymer.

6. The food-coating composition as claimed in claim 1, wherein said emulsifier consists essentially of sodium salts, potassium salts and ammonium salts of unbranched aliphatic carboxylic acids of chain length $C_{12}$-$C_{20}$, sodium hydroxyoctadecanesulfonate, sodium salts, potassium salts and ammonium salts of hydroxyl fatty acids of chain length $C_{12}$-$C_{20}$ and their sulfonation or acetylation products, alkyl sulfates, triethanolamine salts, alkyl($C_{10}$-$C_{20}$)sulfonates, alkyl($C_{10}$-$C_{20}$)-arylsulfonates, dimethyldialkyl($C_8$-$C_{18}$)ammonium chloride, acyl-, alkyl-, oleyl- and alkylarylethoxylates and their sulfonation products, alkali metal salts of sulfosuccinic esters with aliphatic saturated monohydric alcohols of chain length $C_4$-$C_{16}$, sulfosuccinic 4-esters with polyethylene glycol ethers of monohydric aliphatic alcohols of chain length $C_{10}$-$C_{12}$(disodium salt), sulfosuccinic 4-esters with polyethylene glycol nonylphenyl ethers (disodium salt), sulfosuccinic biscyclohexyl esters (sodium salt), lignosulfonic acid and also its calcium, magnesium, sodium and ammonium salts, polyoxyethylene sorbitan monooleate containing 20 ethylene oxide groups, resin acids, hydrogenated and dehydrogenated resin acids and their alkali metal salts, dodecylated diphenyl ether disulfonic acid sodium or copolymers of ethylene oxide and propylene oxide having a minimum content of 10% by weight of ethylene oxide.

7. The food-coating composition as claimed in claim 1, wherein the dispersion consists essentially of the emulsifiers in an amount in the range of from 0.2 to 0.85 parts by weight.

8. The food-coating composition as claimed in claim 1, wherein component 2) consists essentially of cellulose ethers.

9. The food-coating composition as claimed in claim 1, wherein the dispersion consists essentially of the cellulose ethers in an amount in the range from 0 to 0.4 parts by weight.

10. The food-coating composition as claimed in claim 1, wherein said vinyl esters of aliphatic saturated carboxylic acids are vinyl acetate; said maleic esters and/or fumaric esters of monohydric aliphatic alcohols having a chain length of $C_1$-$C_{18}$ are dibutyl maleate and/or fumarate; 1) is an ethoxylated oleyl alcohol present in an amount of from 0.25 to 0.5 parts by weight; 2) is a hydroxyethyl cellulose present in an amount of from 0 to 0.3 parts by weight; 3) is present in an amount of from 3 to 8 parts by weight; and
   wherein the solids content of the dispersion is in the range from 20 to 65% by weight.

11. A process for preparing an aqueous copolymer poly(vinyl ester) dispersion as a constituent in a food-coating composition as claimed in claim 1 by free-radical emulsion polymerization, in which the monomers are added in the batch process, in the feed-stream process, or in the combined batch/feed-stream process, which comprises monomers being charged in an amount in the range from 1 to 15% by weight, based on the total amount of monomers, for starting the polymerization.

12. A hard cheese comprising the food-coating composition of claim 1.

13. The food-coating composition as claimed in claim 1, wherein the dispersion consists essentially of the emulsifiers in an amount in the range of from 0.25 to 0.5 parts by weight.

14. The food-coating composition as claimed in claim 1, wherein the dispersion consists essentially of the cellulose ethers in an amount in the range from 0 to 0.3 parts by weight.

15. The food-coating composition as claimed in claim 1, wherein the dispersion consists essentially of the cellulose ethers in an amount in the range from 0 to 0.15 parts by weight.

16. The food-coating composition as claimed in claim 1, wherein the dispersion consists essentially of no cellulose ethers.

17. The food-coating composition as claimed in claim 1, wherein the total amount of polyvinyl alcohol in the dispersion is in the range from 2 to 9% by weight, based on the mass of the total monomers.

18. The food-coating composition as claimed in claim 1, wherein the total amount of polyvinyl alcohol in the dispersion is in the range from 3 to 8% by weight, based on the mass of the total monomers.

19. The food-coating composition as claimed in claim 10, wherein the solids content of the dispersion is in the range from 30 to 60% by weight.

20. The food-coating composition as claimed in claim 10, wherein the solids content of the dispersion is in the range from 40 to 55% by weight.

21. The food-coating composition as claimed in claim 2, wherein the vinyl ester of aliphatic saturated carboxylic acid with chain length $C_2$-$C_{18}$ is selected from the group consisting of vinyl acetate, vinyl propionate, vinyl butyrate, vinyl isobutyrate, vinyl pivalate, vinyl 2-ethylhexanoate, vinyl esters of α-branched carboxylic acids having 9 to 11 carbons in the acid group, vinyl esters of lauric, palmitic, myristic and stearic acids, and mixtures thereof.

22. The food-coating composition as claimed in claim 21, wherein the vinyl ester of aliphatic saturated carboxylic acid with chain length $C_2$-$C_{18}$ is vinyl acetate.

23. The food-coating composition as claimed in claim 4, wherein the maleic and fumaric esters of monohydric aliphatic alcohols of chain length $C_1$-$C_{18}$ consist essentially of esters with saturated alcohols of chain length $C_4$-$C_8$.

24. The food-coating composition as claimed in claim 4, wherein the maleic and fumaric esters of monohydric aliphatic alcohols of chain length $C_1$-$C_{18}$ is selected from the group consisting of dibutyl maleate, di 2-ethylhexylmaleate, di-2-ethylhexylfumarate, and mixtures di 2-ethylhexylmaleate and di-2-ethylhexylfumarate.

25. The food-coating composition as claimed in claim 6, wherein said emulsifier consists essentially of sodium lauryl sulfate, sodium lauryl ether sulfate, polyethylene glycol (4-20) ethers of oleyl alcohol, or polyethene oxide (4-14) ethers of nonylphenol.

26. The food-coating composition as claimed in claim 8, wherein component 2) consists essentially of methyl cellulose, hydroxyethyl cellulose, propyl cellulose, sodium carboxymethyl cellulose, or mixtures thereof.

* * * * *